United States Patent [19]
Wilkie et al.

[11] Patent Number: 5,482,780
[45] Date of Patent: Jan. 9, 1996

[54] POLYPROPYLENE FILM WITH COLD SEAL RELEASE AND COLD SEAL RECEPTIVE SURFACES

[75] Inventors: Andrew F. Wilkie, Haverhill; Michael D. Butler, North Andover, both of Mass.

[73] Assignee: Borden, Inc., Columbus, Ohio

[21] Appl. No.: 247,830

[22] Filed: May 23, 1994

Related U.S. Application Data

[63] Continuation-in-part of Ser. No. 224,229, Apr. 7, 1994.

[51] Int. Cl.$^6$ .................................................. B32B 27/08
[52] U.S. Cl. ................... 428/515; 428/206; 428/331; 428/446; 428/451; 428/454; 428/500; 428/910
[58] Field of Search ................. 428/304.4, 307.3, 428/308.4, 349, 461, 910, 515, 206, 331, 446, 451, 454, 500, 515, 910; 521/139

[56] References Cited

U.S. PATENT DOCUMENTS

| | | | |
|---|---|---|---|
| 4,230,767 | 10/1980 | Isaka et al. | 428/349 |
| 4,293,608 | 10/1981 | Isaka et al. | 428/220 |
| 4,357,383 | 1/1982 | Howden et al. | 428/213 |
| 4,692,380 | 3/1987 | Reid | 428/349 |
| 4,741,950 | 5/1988 | Liu et al. | 428/315.5 |
| 4,758,396 | 7/1988 | Crass et al. | 264/145 |
| 4,777,081 | 10/1988 | Crass et al. | 428/215 |
| 4,883,698 | 11/1989 | Bothe et al. | 428/35.9 |
| 4,888,237 | 12/1989 | Balloni et al. | 428/347 |
| 4,944,990 | 7/1990 | Liu et al. | 428/353 |
| 4,997,700 | 3/1991 | Bothe et al. | 428/216 |
| 5,026,592 | 6/1991 | Janocha et al. | 428/204 |
| 5,091,236 | 2/1992 | Keller et al. | 428/213 |
| 5,134,173 | 7/1992 | Joesten et al. | 521/139 |
| 5,176,954 | 1/1993 | Keller et al. | 428/317.9 |
| 5,194,318 | 3/1993 | Miliorins et al. | 428/215 |
| 5,209,884 | 5/1993 | Wood, Jr. | 264/41 |
| 5,318,824 | 6/1994 | Itaya et al. | 428/178 |
| 5,318,834 | 6/1994 | Falkes et al. | 428/304.4 |
| 5,326,625 | 7/1994 | Schuhmann et al. | 428/215 |

OTHER PUBLICATIONS

Tech. Info. Bulletin FC–25B of Hercules, Inc. for Hercules WTF 503.
Spec. Sheet for Opptiwrap OHCTW of Borden, Inc.
Spec. Sheet for CCO Two Sided Modified OPP Film of Borden, Inc.

*Primary Examiner*—Patrick J. Ryan
*Assistant Examiner*—William A. Krynski
*Attorney, Agent, or Firm*—Stevens, Davis, Miller & Mosher

[57] ABSTRACT

An oriented polymeric alpha-olefin film having: an isotactic polypropylene homopolymer core; a cold seal release skin layer adherent to one side of the core; and a surface treated cold seal receptive layer or such treated layer with a cold seal cohesive composition over the surface treatment of said layer on the other side of the core. The cold seal release skin layer comprises a slip agent and a blend of two polymers, namely, an ethylene-propylene random copolymer containing about 2% to 8% of ethylene in such copolymer and an ethylene-butylene copolymer containing about 0.5% to 6% of ethylene in such copolymer. The cold seal receptive layer is of an ethylene-propylene random copolymer containing about 2 to 8% of ethylene.

17 Claims, 1 Drawing Sheet

POLYPROPYLENE FILM WITH COLD SEAL RELEASE AND COLD SEAL RECEPTIVE SURFACES

This application is a continuation-in-part of copending application Ser. No. 08/224,229 which was filed on Apr. 7, 1994 with A. F. Wilkie as the sole inventor. A principal difference of this application from the parent Ser. No. 08/224,229 is that the film of this application includes an additional surface treated polyolefinic layer for accepting the cold seal composition.

BACKGROUND OF THE INVENTION (a) Field of the Invention

This invention relates to a composite, oriented polypropylene film which has: a first alpha-polyolefinic skin layer providing a surface which releases easily from a cold seal receptive surface as well as from a cold seal cohesive composition adherent to the receptive surface on the opposite side of the film, such easy release surface is also simply referred to herein as a cold seal release surface; a second alpha-polyolefinic layer on the other side of the film which has a treated surface to which a cold seal cohesive composition is applied, such second surface also referred to herein as a cold seal receptive surface; and a third alpha-polyolefinic layer which is a core layer predominantly of isotactic polypropylene homopolymer. This film is useful in the packaging of articles such as confections.

(b) Background and Prior Art

Cold seal cohesives are generally natural or synthetic rubber latex compositions which when applied to a flexible packaging substrate allow the package to be cohesively sealed by pressure and dwell time at ambient temperature. Cold seal cohesives are generally applied to the inside (cold seal receptive surface) of a film lamination or to a single web film. In each case, the outer film surface (facing away form the cold seal) must repel adhesion to the cold seal on the inner web in order that the roll stock may be unwound when it is used to wrap the product. In the case of single web film, the surface opposing the cold seal is typically coated with a polyamide type overlaquer in order to provide sufficient release from the cold seal, i.e., prevent roll blocking. In the case of laminated films, the outer web of the film is generally modified with migratory additives which when sufficiently bloomed to the surface promote low coefficient of friction (C.O.F.) for machinability and cold seal release (C.S.R.). It is known that migratory additives, particularly amides, coming in intimate contact with the cold seal composition surface in sufficient quantities will cause the cold seal composition cohesive strength to become significantly weakened. This phenomenon is known as cold seal deadening.

Biaxially oriented polypropylene (B.O.P.P.) film by itself does not give adequate cold seal release (C.S.R.) or coefficient of friction (C.O.F.) and requires the addition of additives to accomplish these objectives. These additives, which are predominantly migratory, have two main problems: (1) they must bloom to the film's surface and remain there in order to be consistently effective; and (2) they have a tendency to retard the cold seal cohesive strength. The current industry standard film for this application is a mono-layer B.O.P.P. of isotactic polypropylene homopolymer of Hercules, Inc. containing a migratory amide slip agent and which is designated T 523 or T 522. In the case of T 523, the slip modified film is corona discharge treated to an equal level of both surfaces and, as such, can be used on either side. In the case of T 522, the film is corona discharge treated on only one side. The untreated surface is the preferred surface for cold seal release. These films, however, need to be aged for a period of time after production at a certain temperature so that the cold seal release and C.O.F. additives sufficiently bloom to the surface for the film to be functional.

The present invention is to a single web polypropylene film which can be reverse printed and/or pattern cold seal coated on the cold seal receptive surface and released from the opposing film surface without the need for a cold seal release overprint varnish and the migratory slip agents which deaden the cold seal composition. This eliminates a step in the converting process as well as reducing the overall product costs. This is made possible by a polymeric film surface on one side of the core which gives excellent cold seal release without relying on conventional migratory slip and antiblock additives as well as a surface treated polymeric film layer on the other side of the core which provides a substrate for excellent adhesion of the cold seal composition.

The inventive film demonstrates:

A. Good to excellent coefficient of friction when the film with or without the cold seal composition is unwound from a roll;

B. Good to excellent adhesion of the cold seal composition on the cold seal receptive surface.

C. Excellent optics;

D. Good printability on the cold seal receptive surface;

E. Good machinability and stiffness typical of oriented polypropylene film; and

F. Absence of poisoning (deadening) the cold seal cohesive properties.

The present invention has the following principal advantages over the prior art:

1. Immediate and permanent release of the cold seal receptive surface as well as the cold seal composition from the surface of the cold seal release layer on the other side of the film at the time of manufacture and roll winding of the film. Thus, no film aging is required and therefore the conventional overprint varnish for single web polypropylene films is not required. Elimination of the overprint varnish saves on converting time and costs.

2. Permanently good cold seal receptivity on the cold seal receptive surface.

3. Permanently low coefficient of friction on unwinding a roll of the film due to the absence of migratory slip additives.

4. No cold seal deadening because it does not possess migratory additives in type or quantity do so.

5. The cold seal release surface will readily accept code dating inks.

SUMMARY OF THE INVENTION

In one aspect of this invention a polymeric film is provided wherein a predominantly isotactic polypropylene homopolymer core has on one side thereof an ethylene-propylene random copolymer having a physically modified surface for reception of a cold seal cohesive composition and on the other side of the core there is a blend of an ethylene-butylene copolymer and an ethylene-propylene random copolymer containing a non-migratory slip agent.

In another aspect of the invention the cold seal receptive layer of the film is coated with a cold seal cohesive composition.

In still another aspect, the inventive film having the cold seal composition is used for sealed wrapping of items such as confections.

DETAILED DESCRIPTION OF THE INVENTION

Figure 1:
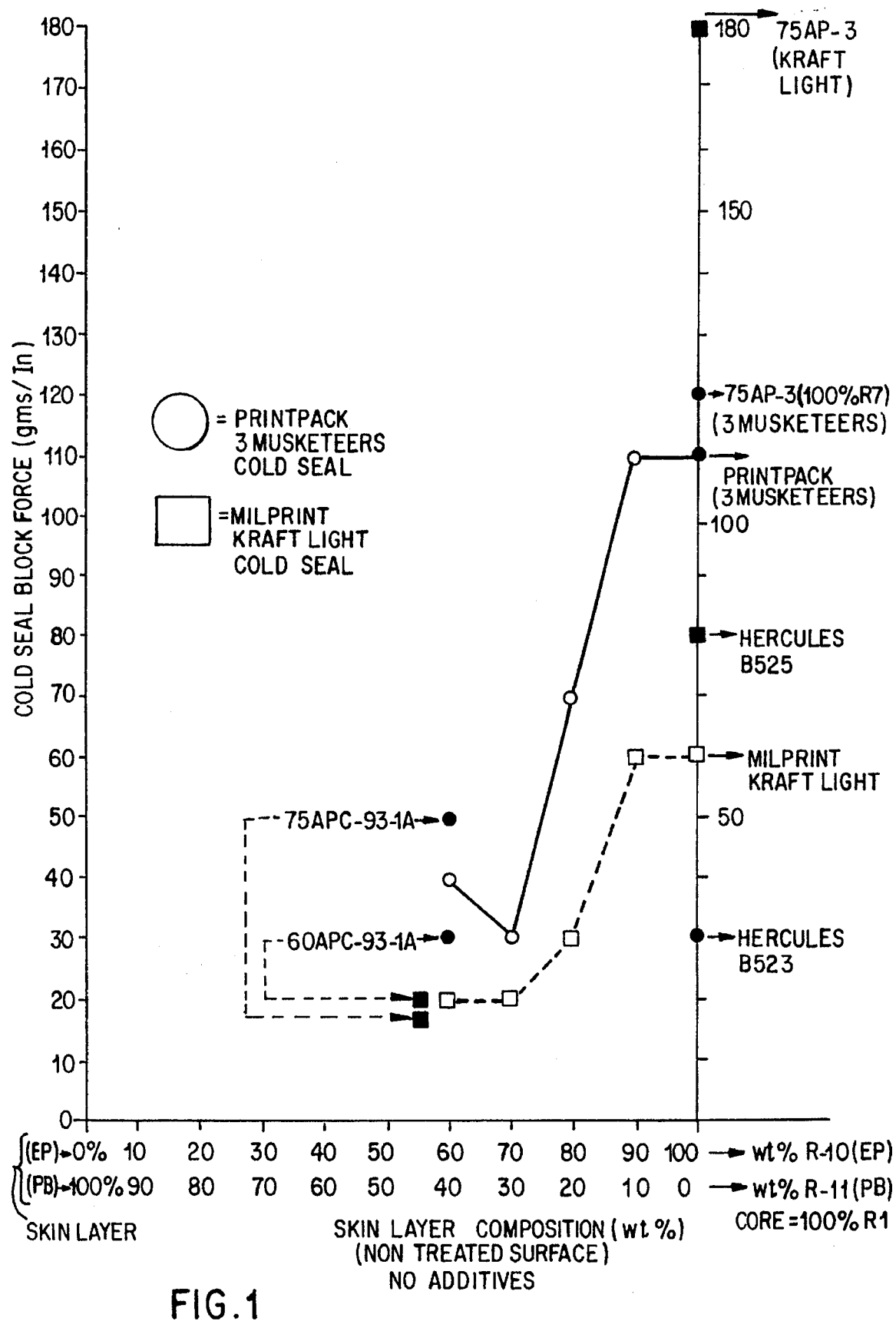
FIG. 1 is a graphic representation of cold seal block force release values (in gms/inch) conducted at block test: 2 sec. steam/ambient pressure 2,500 psi, 30 min/2 hrs/40° C. conditions.

The Cold Seal Release Layer.

The cold seal release skin layer comprises a low ethylene content polybutylene copolymer at 20 to 75 weight percent of such layer and such copolymer is melt blended with an ethylene-propylene random copolymer at 25 to 80 weight percent of such layer. The ethylene content in the ethylene-butylene copolymer is preferably about 0.5 to 6 and particularly about 0.5 to 2.5 or 3 weight percent. The ethylene content of the ethylene-propylene random copolymer is preferably about 2 to 6 weight percent and particularly about 3 to 5 weight percent. This combination of polymers surprisingly provides significantly better cold seal release (with or without corona treatment) than the release obtained using homopolymer polypropylene or ethylene-propylene random copolymers which do not contain surface migratory additives. Corona discharge treating the cold seal release surface of the present film substantially diminishes the heat sealing temperature use range, however, the cold seal release properties remain excellent. By "heat seal" herein is meant temperatures generally in excess of 150° F. For many packaging operations, such temperatures are unacceptable.

The film-to-film and film-to-metal C.O.F. of the release surface of the polymers used in the present invention are moderately high and can benefit from the addition of a non-migratory slip agent in an amount sufficient to decrease the coefficient of friction of the release layer to a coefficient of friction of about 0.2 to 0.4. The weight quantity of such slip agent in the release layer is generally about 0.01 to 1 weight percent. Such non-migratory slip agents useful herein can include various inorganics such as talcs, syloids (micron sized silicas), glass bead, diatomaceous earth, clay and the like. A preferred non-migrating slip agent is from about 1,000 to 10,000 ppm by weight of a cross-linked silicone having a particle size of about 1 to 4.5 microns such as that of TOSPEARL of Toshiba Company. To further enhance slip and release properties of the film, relatively minor amounts of migratory slip/anti-block and anti-static agents, such as amides, stearates and amines can optionally be added to the skin and/or core layers to facilitate the main film functions. Such agents can be used in quantities of about 0 to about 1.0 weight percent and preferably from about 0.05% to 0.5% by weight of such layer. The use of these additives, however, is limited by the propensity to deaden the cold seal composition in the end use application.

The cold seal release skin layer can have a thickness of about 2 to 10 gauge.

The Core Layer

The core layer of the films of the present invention is predominantly isotactic polypropylene homopolymer. It can include small quantities, e.g. less than about 10%, e.g., 2 to 8% of other polymers such as alpha-olefin polymers having about 2 to 4 carbon atoms, e.g. ethylene-propylene random copolymer, ethylene-propylene block copolymer and high density polyethylene. The quantity of high density polyethylene is generally limited to less than 5% such as about 0.5 to 4.5% by weight. Preferably not more than about 4% of such other polymers are included in the core so as not to adversely effect the stiffness, clarity and other physical properties of the oriented polypropylene. Optionally, small quantities of migratory additives can be included in the core layer such as amides, including erucamide, behenamide or glycerol monostearate, or amines. Other inorganics such as, calcium stearate, or silicone oil can also be added to the core layer, but these are often more useful when used within the release skin layer.

The thickness of the core layer can vary over a wide range such as that of about 40 to 200 gauge.

The Cold Seal Receptive Layer

The cold seal receptive layer is preferably from about 1 to 10 gauge in thickness and is fabricated of ethylene-propylene random copolymer containing about 2 to 8% by weight of ethylene and about 92 to 98% by weight of propylene and preferably 3 to 5% of ethylene and 95 to 98% by weight of propylene. The surface of the cold seal receptive layer is subjected to a physical surface-modifying treatment to improve the bond between that surface and the subsequently applied cold seal composition. A preferred treatment is to subject the exposed surface of such layer to a high voltage electrical stress accompanied by corona discharge. Other such surface modifying treatments include flame treatment of the surface of such layer.

The cold seal receptive skin layer can optionally also contain an adhesion promoting agent to improve adhesion to the cold seal composition. Such adhesion promoters include powdered polyamides, e.g. Nylon 6, clay, random alpha-olefin copolymers of 1 to 4 carbon atoms as well as polar polymers such as those containing acrylic or methacrylic acid in a quantity sufficient to enhance adhesion of the cold seal composition to the treated skin surface. The quantity of adhesion promoting agent can vary over a broad range such as from about 1,000 to 4,000 parts per million by weight of the cold seal receptive layer.

Films of the present invention exhibit excellent cold seal release to commercially applied cold seal compositions. Release is immediate from the date of manufacture, without aging, and remains permanent and consistent through aging. Unlike prior art film, no additive migration is necessary to achieve desired release. In fact, migratory release additives are not required in the present cold seal invention, but are preferred. Additionally, good anti-block to reverse printing inks and good ink adhesion and lamination bond strengths on print or laminating surfaces are obtained by the present invention. In addition, according to the present invention, minimal to zero cold seal deadening in the final film is observed.

Manufacture of the polyolefin film according to this invention is carried out by known processes such as coextrusion of the various layers. This includes coextruding through a flat film die the melt corresponding to the individual polymeric layers of the film, cooling the film obtained by coextrusion in order to harden it, orienting, e.g. biaxially stretching, the film, heat-setting the stretched film and surface modifying the surface, e.g., corona treating the cold seal receptive layer and optionally surface treating the release layer such as when it is desired to print thereon. The film can also be coextruded by the blown film or double bubble orientation process.

The composite film structure comprising the core and adherent skins is stretched by conventional techniques to orient the film, prior to surface treatment such as corona discharge. Orientation may be effected uniaxially, by stretching the film in one direction or biaxially, by stretching the film in each of two mutually perpendicular directions in the plane of the film. Biaxial orientation is preferred.

The degree to which the film is stretched depends to some extent on the ultimate use for which the film is intended. Preferably, the film is stretched to between about 4 to 6.5 times its original dimension in the longitudinal direction and about 5 to 10 times in the transverse direction. The longitudinal stretching is expeditiously carried out with the aid of two rolls running at different speeds according to the stretch ratio desired and the transverse stretching with the aid of a corresponding tenter frame.

After stretching, the polymeric film is normally "heat set", while restrained against shrinkage at a temperature above the glass transition temperature of the polymer and below its melting point.

Prior to application of the cold seal layer onto the exposed surface of the cold seal receptive layer, such layer is subjected to a physical surface-modifying treatment to improve the bond between that surface and the subsequently applied cold seal layer. A preferred treatment is to subject the exposed surface to a high voltage electrical stress accompanied by corona discharge. The film is then heat aged to impart further dimensional stability to the film. In case the release layer of the film on the other side of the core is to be printed, the surface of such layer is also modified by corona discharge or flame treatment.

The thickness of the film of this invention can vary over a wide range but preferably from about 70 to 150 gauge.

A preferred film structure and formulation is described below wherein: layer A is the cold seal release layer; layer B is the core layer; and layer C is the cold seal receptive layer wherein the film is produced via conventional coextrusion and biaxially oriented polypropylene (B.O.P.P.) film technology. The thickness of the film is given in gauge (G). The abbreviation: B is for butylene; GMS is for glycerol monostearate; HDPE is for high density polyethylene; E is ethylene; and EP is ethylene propylene random copolymer.

| | Layer | Formulation/Structure |
|---|---|---|
| 5.5 G | A | 40% copolymer of B and 0.5% E + 3,000 ppm GMS, 2,000 PPM of cross linked silicone having a particle size of 3 microns, 1,500 PPM kaolin clay, and 60% of EP containing 5% of E wherein the surface of this layer has not been modified. |
| 140 G | B | 1,000 ppm HDPE in 100% isotactic polypropylene homopolymer |
| 5 G | C | 100% of EP containing 3% ethylene wherein the surface of this layer has been modified by corona treatment. |

Typical physical properties for the above film are as follows: nominal thickness of about 1.0 mil; yield in square inches per pound of 30,600; tensile strength in pounds per square inch of 16,000 in the machine direction and 42,000 in the transverse direction; elongation of 125% in the machine direction and 30 in the transverse direction; tensile modulus of 250,000 psi in the machine direction and 550,000 psi in the transverse direction; dimentional stability measured as % shrinkage at 275° F. of 5 in the machine direction and 4 in the transverse direction; water vapor transmission rate measured as grams per 100 square inches in 24 hours at 100° F. and 90% of relative humidity of 0.33; kinetic coefficient of friction (kinetic film/film) on the release side of 0.25; haze of 2.5% Gardener Hazegard; and gloss at 45° of 85% Gardner Glossgard on the release side.

The cold sealing process of the present invention is preferably achieved at a temperature of less than 150° F., and more preferably at a temperature range of from 65° F. to 85° F. In the cold sealing process of the present invention, the films of this invention are subjected to sufficient pressure and for sufficient time to achieve the desired cold seal. The time needed for pressure application to achieve cold sealing can be from 0.1 to 1 second, but these times are not limitations of the present invention. In one embodiment, the cold seal pressure can be from about 20 to 100 psi, and more preferably is from 70 to 90 psi.

The resulting cold sealed films of the present invention preferably exhibit a release force of from about zero to about 75 grams/inch, but 5 to 50 grams per inch is preferred.

EXAMPLE 1

This example shows the excellent cold seal release properties of films of the parent application. The results of this example are shown in Table 1 below. The film, a 70 gauge Borden Proponite film product, contains essentially no migratory additives associated with cold seal release. This is cold seal laminated to a commercial M&M/Mars Three Musketeers film, which, as such, is the prime example of the skin layer release composition of ethylene-propylene random copolymer and ethylene polybutylene copolymer showing its C.S.R. property. This laminated composite film is a B.O.P.P. product with the surface being non-treated and heat sealable. The state of the art film, a conventional 75 gauge Hercules B523, also shows excellent C.S.R. in Table 1. However, the Hercules film represents the optimum performance for a film containing a fully matured migratory additive package. The Hercules film showed a block force reading of cold seal release of 25 grams per inch width, while a standard 70 gauge Borden Proponite C.S.X. film surface, non-corona treated, and comprising no migratory additives, exhibited a more desirable block force cold seal release measurement of only 15 grams per inch width. The C.S.X. film is a commercial B.O.P.P. product which is generally metallized to form another commercial product, namely, Proponite C.S.E. film. Further, a 75 gauge Borden Proponite AP-1 film with a fully bloomed additive package showed excellent C.S.R. value of 5 grams per inch width, a value clearly superior to the value exhibited by the Hercules B523 film. The Proponite AP-1 film is a commercial product which is a slip modified laminating grade B.O.P.P. film with an isotactic polypropylene homopolymer core containing slip additives and a skin of ethylene propylene random copolymer containing slip additives. Also, included in Table 1 is a standard slip-modified corona treated homopolymer 75 gauge Borden Proponite A film. Proponite A film is a commercial product which is a slip modified laminating grade B.O.P.P. film containing migratory slip and antistatic additives and with a skin which is mainly isotactic polypropylene homopolymer. This film demonstrated the deficiency of a polypropylene homopolymer surface with an insufficient migratory additive package for C.S.R., yielding an undesirable high block force cold seal release value of 90 grams per inch width.

TABLE 1

Block Force*
(Cold Seal Release)

| BOPP Film Type | gms/in. width | Comments |
| --- | --- | --- |
| Hercules 75 g B523 | 25 | Competitive fully bloomed/aged state of the art monolayer film, corona treated surface, at least 2 years old. |
| 70 g Proponite CSX | 15 | Release surface of this invention on cold seal composition with no migratory additives and non-corona treated release surface. |
| 75 g Proponite AP-1 | 60 | Coextruded, corona treated ethylene-propylene copolymer release surface, not fully bloomed. |
| 75 g Proponite AP-1 | 5 | Same as above except fully bloomed, additive package aged 4 months at 40° C. |
| 75 g Proponite A | 90 | Coextruded slip modified, corona treated surface, homopolymer polypropylene film. |

*Commercial Three Musketeers cold seal lamination. Block conditions: 2 seconds, moisture/ambient temp/100 psi. load, 2 hours./40° C., 1 lb. load.

EXAMPLE 2

This example shows that a B.O.P.P. film having the cold seal release layer of this invention has immediately good C.S.R. with a commercial cold seal composition without the need for migratory additives to be bloomed to the surface. The results of this example are shown in Table 2 hereafter. The conventional Hercules B523 film shows moderately good C.S.R. to a commercial cold seal lamination which doesn't improve upon heat aging the film. This demonstrates that the competitive Hercules film has a fully mature additive package. A cold seal film having the release layer of this invention, namely, Borden Proponite 75 gauge APC-93-1A film, is presented in Table 2 for both corona-treated and non-corona-treated samples. This APC-93-1A film lacks the additional polyolefinic layer of this invention for receiving the cold seal composition. These films also contain an additional, but not essential, migratory additive package. However, the cold seal films having the release layer of this invention demonstrate good to excellent C.S.R. immediately without the need for migratory additives to be fully bloomed. There is a slight improvement in C.S.R. with heat aging. Both treated and non-treated surfaces are shown to be effective for cold sealing in this example. The Proponite 75 gauge film APC-93-1A had the following composition for (a) its 5.5 gauge cold seal release skin layer: 60% by weight of a 5% ethylene content for an ethylene-propylene copolymer blend with 40% by weight of an ehtylene-butylene copolymer containing 0.5% of ethylene with the remainder being essentially butylene; 3,000 ppm of high density polypropylene, 5,000 ppm calcium stearate; 2,500 ppm stearamide; 1,5000 ppm kaolin clay; and 2,000 ppm of 3 micron cross linked silicone and (b) for the 69.5 gauge core layer: 99.1% isotactic polypropylene homopolymer; 1,000 ppm high density polyethylene; 3,500 ppm stearamide; 3,500 ppm behenamide; and 1,000 ppm erucamide. The composition of the Proponite 75 gauge Isotatic homopolymer polyproylene film in Table 2 which was surface treated had the following composition: (a) for the skin layer of 4 gauge: 97% isotactic polypropylene homopolymer; 3% high density polyethylene, 2,000 ppm of 2 micron cross linked silicone; 3,000 ppm erucamide; and 7,000 ppm of behenamide; and (b) a core layer composed of 99.2% isotactic polypropylene homopolymer; 1,000 ppm erucamide, and 7,000 ppm behenamide. The Proponite AP-3 film is much the same as the AP-1 film but uses different slip agents.

TABLE 2

Block Force (gms/inch width)
Commercial Kraft 16 Slice American Singles
Cold Seal Lamination

| Film Type | Aging Condition of Film | | | |
| --- | --- | --- | --- | --- |
|  | 1 Day Ambient | 7 Days Ambient | 1 Day 40° C. | 5 Days 40° C. |
| Hercules 75 g B523 (2+ years old) | 50 | 50 | 60 | 40 |
| Proponite 75 g AP-3 coextruded, corona treated, slip modified commercial BOPP Proponite 75 g film APC-93-1A | 120 | 120 | 45 | 15 |
| Non-treated release surface | 35 | 25 | 15 | 15 |
| Corona treated release surface | 25 | 35 | 25 | 10 |
| Proponite 75 g isotactic polypropylene homopolymer corona surface, treated film. | 160 | 150 | 140 | 45 |

The core layer surface in the above examples was corona treated in all instances.

EXAMPLE 3

This example, as illustrated in Table 3, shows the results of cold seal block force testing of films of a different gauge (g). The films of this example include the formulation APC-93-1A which uses the cold seal release layer used in this invention and two different commercial cold seal films. The C.S.R. surface of the APC-93-1A film is corona-treated to a minimal level and shows excellent immediate C.S.R. to both cold seals, that is, a value of 25 grams per inch on the Kraft Singles cold seal test 25 grams per inch on the M&m/Mars Twix cold seal test. The same film without corona treatment exhibited even lower cold seal block force values of 15 grams per inch both tests. The Hercules B523 film also shows good to excellent C.S.R. to both cold seals, however after wiping the film surface with a solvent to substantially remove the bloomed surface additives, the C.S.R. properties of the Hercules B523 film became significantly impaired. This condition represents Hercules B523 when it is not fully aged. It also represents a case where the surface additives are driven back into the film through processing thereby negatively affecting both C.S.R. and C.O.F. This phenomenon has been reported by converters and is considered a negative feature of the prior art film. In Table 3 the letter "A" represents tests performed with Kraft 16 slice American Singles cold seal and the letter "B" represents tests done on M&M/Mars Twix cold seal

TABLE 3

Cold Seal Block Force
(gms/inch width)

| Film Type | Aged Condition | A | B | Comments |
| --- | --- | --- | --- | --- |
| 100 g APC-93-1A | Ambient 2 days | 25 | 25 | Release surface was corona treated |
| 100 g APC-93-1A | Ambient 2 days | 15 | 15 | Release surface was untreated |
| Hercules B523 | Ambient 2+ years | 55 | 20 | Competitive state of the art, fully aged film corona treated on both surfaces |
| Hercules B523 (4/91) [alcohol wiped 10× to remove amides | Ambient 2+ years | 140 | 70 | Competitive state of the art, film with surface amides removed |
| Mobil LCM-W | Ambient 1+ year | 150 | 80 | Competitive slip film without corona treated release surface |
| Mobil LCM-W [alcohol wiped 10× to remove amide] | Ambient 1+ year | 120 | 75 | Competitive slip film without corona treated release surface |
| Commercial front of Kraft lamination (Borden 75 g AP-1) | Ambient <4 mo. | 140 | — | Commercially acceptable lamination |
| Commercial front of M&M/ Mars Twix Lamination (Borden 100 g AP-1) | Ambient 3 mos. | — | 70 | Commercially acceptable lamination |

EXAMPLE 4

This example compared B.O.P.P. films where the concentration of the ethylene-propylene random copolymer was varied from 60–90 weight percent and the ethylene-butylene copolymer component was varied from 10 to 40 weight percent. The results of this example are shown in FIG. 1. These films contained no additives of any kind and the film surfaces were not corona treated. Two commercial cold sealed film structures were used to measure C.S.R. The results indicated that good C.S.R. was achieved when the level of polybutylene copolymer was greater than 10 weight percent and preferably greater than 20 weight percent in the release layer. Specifically, for a 75 gauge B.O.P.P. film having the inventive construction of the parent application, with 60 weight percent polybutylene copolymer, a C.S.R. value of 50 grams per inch cold seal block force was obtained. On a 60 gauge B.O.P.P. of the parent case, also bearing 60 weight percent ethylene-propylene random copolymer and 40 weight percent polybutylene containing about 0.5% by weight of ethylene, a cold seal block force measurement of about 30 grams per inch was obtained. These values were obtained for the Three Musketeer cold seal test. Cold seal block force values for the preceding films were each 20 grams per inch. These values compare quite favorably to or are better than, the values obtained for Hercules B523.

EXAMPLE 5

This example was run to demonstrate cold seal block force test measurements in grams per inch comparing Hercules B523 film to two cold seal films of the parent application. The tests were run on 3 Musketeers cold seal and Kraft Light cold seal. The Hercules prior art film had a cold seal test value of 30 grams per inch, as did the 60 gauge film of the parent application. The Kraft Light cold seal test value for both 75 and 60 gauge inventive film of the parent case was significantly lower, exhibiting values of 20 grams per inch. More detailed results of this example are shown in FIG. 5 of copending application Ser. No. 08/224/229.

EXAMPLE 6

This example compared the cold seal adhesion of a corona treated ethylene-propylene random copolymer (RCP) surface film with a corona treated homopolymer polypropylene (PP) surface. The copolymer film has two skin layers on each side of the core. The core is 99% B.O.P.P. containing 1% of HDPE. The skin layers on each side of the core have the same polymeric composition, namely, an ethylene-propylene random copolymer containing 3% of ethylene but one layer contains a slip agent such as Kaolin clay or cross-linked silicone. The homopolymer film is a two layer structure with a core and skin of B.O.P.P. wherein the skin also contains kaolin clay at a concentration of about 3,000 ppm. together with about 6.7% of ethylene-propylene random copolymer containing about 3 to 5% of ethylene. The results of this example are presented in Table 6. The RCP surface averaged 348/345 gms/in peak/average versus the PP surface which averaged 309/275 gms/in. peak/average for a 12.6% peak and 18.2% average improvement respectively with the seven commercial cohesive compositions studied.

TABLE 6

| Cohesive Type[1] | Cold Seal Adhesion (gms/in.)[2] | |
| --- | --- | --- |
| | Borden RCP | Borden PP |
| Findly Adhesives, Inc. Nip Weld 207-939 | 385/315 | 310/285 |
| Findley Adhesives, Inc. Nip Weld 211-939 | 390/405 | 405/345 |
| Findley Adhesives, Inc. Nip Weld C1099 | 420/340 | 325/300 |
| Technical Coatings Co. Coseal 30070 | 390/365 | 305/250 |
| Corda Apex Adhesives Corda Seal 22-0798 | 235/230 | 240/190 |
| Corda Apex Adhesives Corda Seal 22-475 | 355/340 | 320/300 |
| Corda Apex Adhesives Corda Seal 22-126 | 260/270 | 260/260 |

[1]Applied "as is" with a No. 7 Meyer rod to 3.5 lb./ream, dried at 200° F./30 seconds.
[2]Cold sealed with ambient temperature serrated jaws/0.5 sec dwell/60 psi.

While certain preferred embodiments of the present invention have been disclosed it is to be understood that various modifications may be adapted without departing from the spirit of the invention or scope of the following claims. Percentages and quantities in the specification and claims, unless otherwise specified are by weight. Gauge thickness is often referred to as "g" herein.

What is claimed is:

1. A coextruded biaxially oriented polypropylene packaging film comprising:

A. a 70 to 150 gauge core layer fabricated of isotactic polypropylene homopolymer;

B. said core layer having on one side thereof:
      a 2 to 10 gauge cold seal release layer comprising a blend of (a) about 25% to 80% by weight of an ethylene-propylene random copolymer containing about 2% to 8% of ethylene (b) 20% to 75% by weight of an ethylene-butylene copolymer containing about 0.5% to 6% by weight of ethylene and about 94 to 99.5% of butylene and (c) a non-migratory slip agent in an amount sufficient to decrease the coefficient of friction of the release layer; and C. said core layer having on the other side thereof a 1 to 10 gauge cold seal receptive skin layer fabricated of an ethylene-propylene random copolymer containing from about 2% to 8% of ethylene and 92 to 98% of propylene, said cold seal receptive skin layer having an outer surface which has been surface modified to make it more receptive to a cold seal cohesive composition.

2. The film of claim 1 wherein the slip agent comprises from about 1,000 to 10,000 parts per million by weight of cross-linked silicone having a particle size of about 1 to 4.5 microns and the quantity of ethylene in the ethylene-butylene copolymer is from about 0.5% to 3%.

3. The film of claim 2 wherein the cold seal release layer contains kaolin clay in a quantity sufficient to decrease the coefficient of friction and the quantity of ethylene in the ethylene-propylene random copolymer is from about 3% to 5%.

4. The film of claim 1 wherein the cold seal release layer includes up to about 3% of high density polyethylene.

5. The film of claim 1 wherein the cold seal release skin layer has its surface physically modified to be more receptive to ink.

6. The film of claim 5 wherein the surface modification is by corona treatment.

7. The film of claim 1 wherein the cold seal receptive skin layer has its outer surface modified by a method selected from the group consisting of flame spraying and corona treatment to make it receptive to adherence of the cold seal cohesive composition.

8. The film of claim 7 wherein the said receptive skin layer is coated with a cold seal cohesive composition.

9. An oriented composite polyolefin film comprising:

A. a core layer of an alpha olefin containing at least 90% by weight of isotactic polypropylene homopolymer;

B. a cold seal release skin layer on one side of the core said layer comprising a blend of (a) from about 25% to 80% by weight of an ethylene-propylene random copolymer containing from 2% to 8% by weight of ethylene (b) from about 20% to 75% by weight of an ethylene-butylene copolymer containing from about 0.5% to 6% of ethylene and (c) a non-migrating slip agent in an amount sufficient to provide to such layer a coefficient of friction of not greater than about 0.4; and C. a cold seal receptive skin layer of an ethylene-propylene random copolymer on the other side of the core, said random copolymer containing about 2% to 8% of ethylene and wherein the surface of the receptive layer has been physically modified so as to better adhere to a cold seal composition.

10. The film of claim 9 wherein the surface of the receptive layer has been modified by flame or corona treatment.

11. The film of claim 10 wherein the surface of the receptive layer is modified by corona treatment.

12. The film of claim 9 wherein the core contains from about 0.5% to 5% of high density polyethylene.

13. The film of claim 9 wherein: the core contains at least 95% by weight of isotactic polypropylene homopolymer; the quantity of ethylene in the ethylene-butylene copolymer is from about 0.5% to 3%; and a cold seal cohesive composition is adhered to the physically modified surface of the cold seal receptive layer.

14. The film of claim 9 wherein the release layer contains from about 0.3 to 3% of high density polyethylene.

15. The film of claim 9 wherein the slip agent is cross linked silicone having a particle size of about 1 to 4.5 microns.

16. The film of claim 9 wherein the slip agent is a combination of cross linked silicone and kaolin clay.

17. The film of claim 9 wherein the core is fabricated of isotactic polypropylene homopolymer blended with an ethylene-propylene random copolymer, ethylene-propylene block copolymer, or high density polyethylene.

* * * * *